United States Patent [19]
Lindner et al.

[11] 4,371,029
[45] Feb. 1, 1983

[54] LATENT HEAT ACCUMULATOR

[75] Inventors: Friedrich Lindner, Stuttgart; Kurt Scheunemann, Emmendingen, both of Fed. Rep. of Germany

[73] Assignee: Deutsche Forschungs- und Versuchsanstalt für Luft- und Raumfahrt e.V., Bonn, Fed. Rep. of Germany

[21] Appl. No.: 244,969

[22] Filed: Mar. 18, 1981

[30] Foreign Application Priority Data

Mar. 20, 1980 [DE] Fed. Rep. of Germany ....... 3010625

[51] Int. Cl.³ ............................................. F28D 21/00
[52] U.S. Cl. ...................................... 165/10; 165/111; 126/436
[58] Field of Search ................ 165/10, 104.11, 104.17, 165/111; 126/436

[56] References Cited

U.S. PATENT DOCUMENTS

| | | | |
|---|---|---|---|
| 4,091,863 | 5/1978 | Schroder | 165/104.17 X |
| 4,270,523 | 6/1981 | Heel | 165/10 X |
| 4,280,553 | 7/1981 | Bean et al. | 165/104.17 |
| 4,300,622 | 11/1981 | Lindner | 165/10 X |

FOREIGN PATENT DOCUMENTS

| | | | |
|---|---|---|---|
| 2828675 | 1/1980 | Fed. Rep. of Germany | 126/436 |
| 53-11343 | 1/1978 | Japan | 165/10 |

*Primary Examiner*—Albert W. Davis, Jr.
*Attorney, Agent, or Firm*—Laubscher, Philpitt & Laubscher

[57] ABSTRACT

A latent heat accumulator is disclosed including a vessel for receiving a latent heat storage medium and a circuit for a heat exchanger medium. The heat exchanger medium is immiscible with the latent heat storage medium, has a different density than the heat storage medium and is openly conveyed through the heat storage medium. The vessel contains a collecting chamber for the heat exchanger medium and has a heat exchanger arranged therein. An external heat carrier medium flows through the heat exchanger for transfer of heat between the heat carrier medium and the heat exchange medium. The accumulator is characterized in that a first heat carrier medium for adding heat and a second heat carrier medium for withdrawing heat are conveyed in the heat exchanger in separate conduit systems which are in heat-conductive contact with each other and with the surrounding heat exchanger medium.

9 Claims, 6 Drawing Figures

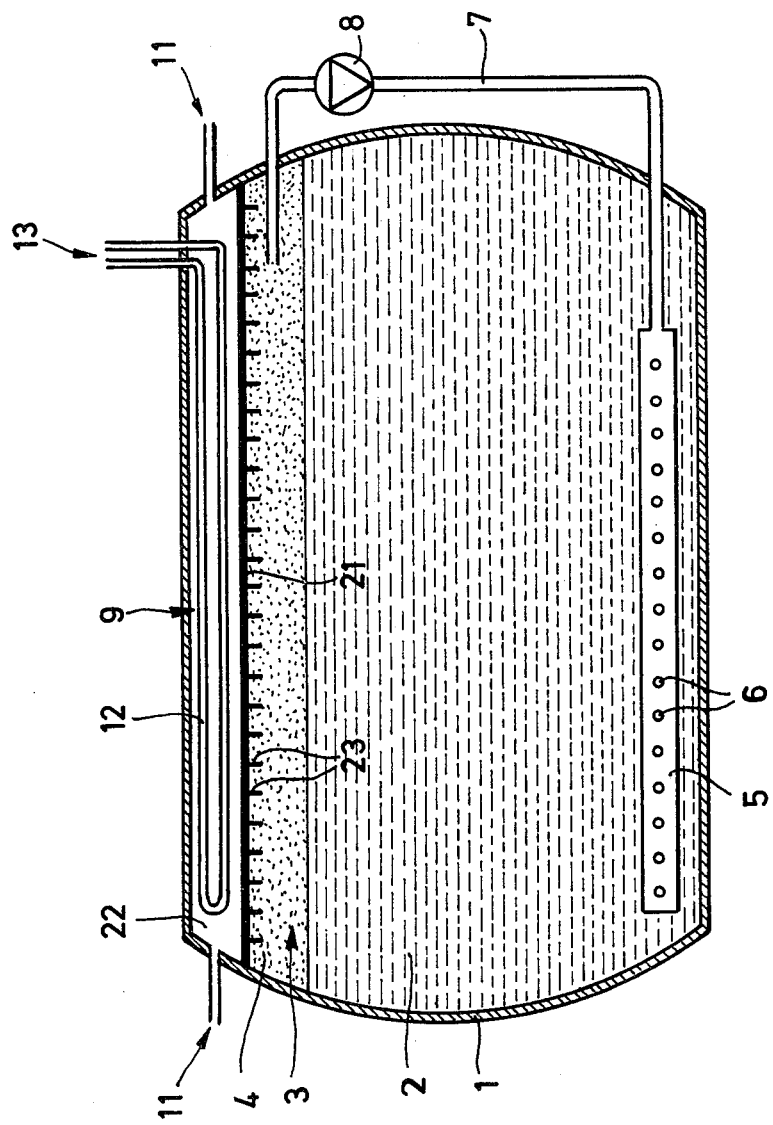

LATENT HEAT ACCUMULATOR

BACKGROUND OF THE INVENTION

The invention relates to a latent heat accumulator comprising a vessel for receiving a latent heat storage medium and a circuit for a heat exchanger medium, this being immiscible with the latent heat storage medium, having a different density to the heat storage medium and being openly conveyed through the storage medium, a collecting chamber being provided in the vessel for the heat exchanger medium, a heat exchanger being disposed in this collecting chamber, an external heat carrier medium flowing through this heat exchanger, which brings about a transfer of heat between heat carrier medium and heat exchanger medium.

BRIEF DESCRIPTION OF THE PRIOR ART

Such a device is described in U.S. Pat. No. 2,969,894. A latent heat accumulator of this type enables a very effective transfer of heat from the heat exchanger medium to the heat storage medium and vice versa since the liquid exchanger medium is freely conveyed through the heat storage medium and therefore comes in direct contact with it. Due to the difference in density the liquid heat exchanger medium, after it has passed through the heat storage medium, is collected in a collecting chamber, for example above the heat storage medium. However, it has become apparent that with this process the heat exchanger medium can carry along small quantities of the heat storage medium despite its lacking miscibility with this heat storage medium. When the heat exchanger medium is conveyed in an external circuit, e.g. through a heat exchanger, there is a risk that the displaced substance may be deposited and accumulate at critical points, e.g. in such external heat exchangers or in an internal overflow as described, for example, in the U.S. Pat. No. 4,086,958. This accumulation may proceed so far that the circuit of the heat exchanger medium is blocked.

SUMMARY OF THE INVENTION

The object of the invention is to improve a latent heat accumulator of this type such that a displacement of heat storage substance by the heat exchanger medium does not impair the exchange of heat with the latent heat accumulator even when operated for a long period.

This object is accomplished for a latent heat accumulator of the type described at the beginning by conveying a first heat carrier medium adding heat and a second heat carrier medium withdrawing heat in separate conduit systems, the two conduit systems being in heat-conductive contact with each other and with the surrounding heat exchanger medium.

A heat exchanger is therefore provided in the collecting chamber of the heat exchanger medium, in which the heat carrier medium adding heat, the heat carrier medium withdrawing heat and the heat exchanger medium penetrating the heat storage substance are all in heat-conductive contact. The heat exchanger medium does not, therefore, have to be conducted through special heat exchangers, in which the depositing of heat storage medium would be harmful. It is sufficient for the heat exchanger medium to be introduced into the heat storage medium again via a simple return conduit from the collecting chamber.

In addition, this arrangement has the great advantage that the addition and withdrawal of heat can take place at the same time. The latent heat accumulator then acts as a buffer, i.e. heat is stored when the addition of heat is greater than the withdrawal of heat whereas heat is extracted when the withdrawal of heat is greater than the addition of heat. If heat is added and withdrawn at the same time the transfer of heat from the system adding heat to the system withdrawing heat can be direct, only the difference will be supplied or received by the surrounding heat exchanger medium.

A preferred embodiment of the latent heat accumulator is provided with exchanger surfaces in heat-conductive contact with the heat exchanger medium, these being, in the main, vertical surfaces. This has the advantage that particles of the displaced heat storage medium, which are to be formed in the heat exchanger medium and are deposited on the heat exchanger surfaces, fall downwards under the influence of gravity and back into the heat storage substance again.

In the case of a latent heat accumulator comprising melting conduits in the storage vessel, which are in heat-conductive contact with a conduit supplying the heat exchanger medium to the heat storage medium and lead from this conduit into the collecting chamber, it can be advantageously provided that the melting conduits have heat carrier medium flowing through them. For example, the melting conduits can have the first heat carrier medium adding heat flowing through them. It is, however, also possible to have a heat pump disposed in the second conduit system withdrawing heat and for at least a portion of the heat carrier medium heated by the heat pump to be conveyed through the melting conduits.

In this case the melting conduits may be connected optionally in parallel to the conduit systems directed through the heat exchanger and optionally in series to these conduit systems.

In the case of a further, preferred embodiment of a latent heat accumulator comprising melting conduits in the storage vessel, these being in heat-conductive contact with a conduit supplying the heat exchanger medium to the heat storage medium and leading from this conduit into the collecting chamber, a heat pump is provided in the second conduit system withdrawing heat, a medium to be used being heatable via its condensor, and the melting conduits have at least a portion of the medium to be used flowing through them.

Additional, advantageous developments of the invention are the subject matter of further subclaims.

BRIEF DESCRIPTION OF THE FIGURES

The following specification of preferred embodiments of the invention serves to give more detailed explanations in association with the drawings, in which

FIG. 6 is a view similar to FIG. 1 comprising a preferred embodiment of the heat exchanger.

DETAILED DESCRIPTION

Figure 1:
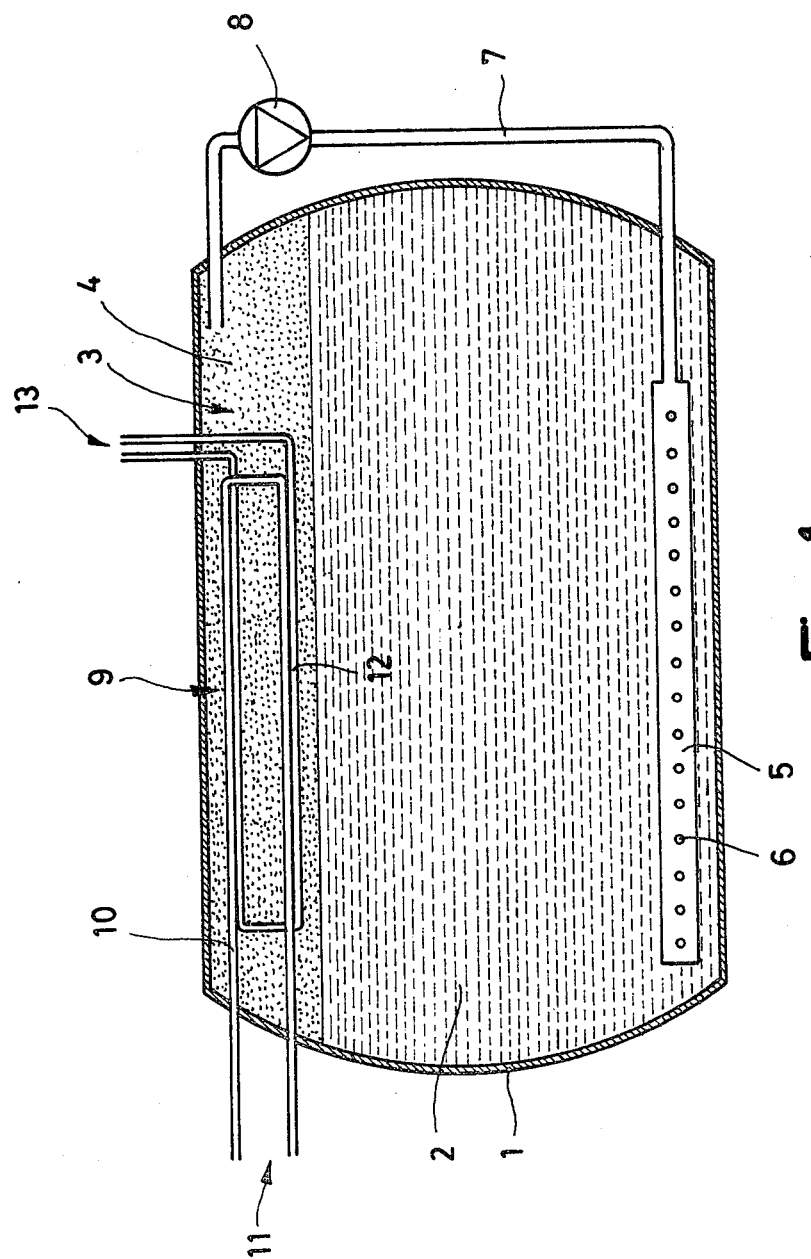
FIG. 1 is a schematic sectional view of a latent heat accumulator comprising a heat exchanger in the heat exchanger collecting chamber with two separate conduit systems.

The latent heat accumulator schematically illustrated in FIG. 1 shows the essential features of such an accumulator, i.e. an enclosed vessel 1, which is mainly filled with a heat storage medium 2 and has above this heat storage medium a collecting chamber 3 for a liquid or gaseous heat exchanger medium 4. The heat storage medium is a latent heat storage medium, i.e. a medium which converts into the solid state when heat is extracted. This medium can be congruently melting substances, i.e. substances which become solid when a certain melting temperature is reached, or incongruently melting substances which, when the temperature sinks, extract an increasing number of solid substances according to a chemical equilibrium. The latent heat accumulator illustrated is suitable for both types of substance; its operation is, however, particularly advantageous when used with incongruently melting systems. The latent heat storage material can, for example, be a Glauber's salt solution.

The heat exchanger medium is selected such that it is liquid or gaseous at all operating temperatures, is immiscible with the heat storage medium and has a density which clearly differs from that of the heat storage medium. In the case illustrated the density of the heat exchanger medium is less than that of the heat storage medium. A mineral oil can, for example, be used as heat exchanger medium.

An outlet conduit 5 with a plurality of outlet apertures 6 is provided on the bottom of the vessel 1. The outlet conduit 5 is connected to a return conduit which begins in the collecting chamber 3 and into which a circulating pump 8 is connected. In the embodiment illustrated the return conduit 7 partly runs outside the vessel 1; it may also be conducted inside the vessel 1.

A heat exchanger 9, which is in heat-conductive contact with the heat exchanger medium 4 in the collecting chamber 3, is located in the collecting chamber 3. The drawing only shows a schematic representation of this heat exchanger 9 by means of a loop 10 of a first conduit system 11, hereinafter called the primary circuit, as well as a loop 12 of a conduit system 13, hereinafter called the secondary circuit.

A heat carrier medium is conveyed in the conduit system 11, for example a fluorohydrocarbon as it is usually used for heat transport. The primary circuit, which is not illustrated in full in the drawing, serves to feed heat by means of the heat carrier medium; a heat source is connected into the circuit outside the vessel 1, this heat source heating the heat carrier medium circulating in the primary circuit.

In the same way a heat carrier medium is located in the second loop 12; this may also be, for example, a fluorohydrocarbon. The secondary circuit serves to withdraw heat from the collecting chamber; a heat sink, which is also not illustrated in FIG. 1, is connected into the secondary circuit.

The heat exchanger 9 is only schematically illustrated in FIG. 1. Essential for this heat exchanger is the fact that the heat carrier medium in conduit system 11 is in heat-conductive contact within the heat exchanger with the heat carrier medium in conduit system 13 as well as with the heat exchanger medium 4 in the collecting chamber 3 so that a transfer of heat between the two heat carrier mediums and the heat exchanger medium can take place. In constructions for practical use the two conduit systems 11 and 13 are conducted through the collecting chamber not only in the form of simple loops; conduit systems will be used here, in the known way, which have large heat exchanger surfaces. In this respect it is particularly advantageous if the heat exchanger surfaces connected with the heat exchanger medium in the collecting chamber are vertical surfaces and preferably smooth. Should, for example, heat storage medium 2 in a solid state, carried along by the heat exchanger medium 4, be deposited on the heat exchanger 9, this solid heat storage medium can be caused to melt by heat being fed to the heat exchanger 9; if the heat exchanger surfaces are vertically disposed the heat storage medium will fall downwards under the influence of gravity, i.e. in this way the heat exchanger 9 is self-cleaning. The danger of a permanent accumulation of the heat storage medium on the heat exchanger 9 is thereby eliminated.

During operation of the latent heat accumulator illustrated in FIG. 1 the heat exchanger medium 4 is conveyed by the pump 8 through the return conduit 7 to the outlet conduit 5, from which the liquid or gaseous heat exchange medium escapes into the heat storage medium 2. It then flows through the entire layer of heat storage medium and into the collecting chamber 3, an intensive heat exchange contact with the heat storage medium taking place as it flows through this heat storage medium.

In order to charge the accumulator (addition of heat) heat is fed via the primary circuit, this heat transferring to the heat exchanger medium 4 in the heat exchanger 9. In the same way heat is withdrawn from the heat exchanger medium 4 via the heat carrier medium in the secondary circuit 13 in order to discharge the accumulator (withdrawal of heat). These two procedures can take place at the same time, a direct transfer of heat also being possible between the primary circuit 11 and the secondary circuit 13 due to the close heat-conductive contact of these two circuits. Only the difference in the amount of heat will be supplied to or received from the heat exchanger medium. As a whole the heat exchanger medium and the heat storage medium in heat-conductive contact with it therefore act as a buffer at the heat transfer point between primary circuit 11 and secondary circuit 13.

It is advantageous in this respect that the heat exchanger medium is conveyed only a narrow circuit so that the latent heat accumulator as such forms a fully functional, constructional unit. The heat exchanger medium must not be conducted through external circuits so there is also no danger of the heat exchanger medium in the external units, for example heat exchangers, heat pumps etc., escaping. On the contrary, it is possible to use various heat carrier mediums for the charging and discharging of the heat exchanger medium; these heat carrier mediums can be adapted to suit any purpose and, for example, would also enable particularly good use to be made of the sun's energy in solar collectors. In addition, the system according to the invention allows use of a heat carrier medium favourable to the environment, e.g. water for a heating system, in, for example, the secondary circuit 13 even if a heat exchanger medium is used which is unfavourable to the environment. The heat exchanger medium, which is unfavourable to the environment, is, in practice, used only in the latent heat accumulator itself and can be adequately screened off.

In addition, an essential advantage of the latent heat accumulator described is to be seen in the fact that the circuit of the heat exchanger medium is very simply constructed. Heat storage medium carried along by the heat exchanger medium therefore has hardly any opportunity to accumulate permanently in the simple heat carrier medium circuit so the incidence of trouble in the latent heat accumulator module is slight.

Several modifications and advantageous developments of the basic construction explained on the basis of FIG. 1 will be described in the following on the basis of FIGS. 2 to 5. Parts, which correspond to the parts of the latent heat accumulator described on the basis of FIG. 1, have the same reference numerals.

Figure 2:
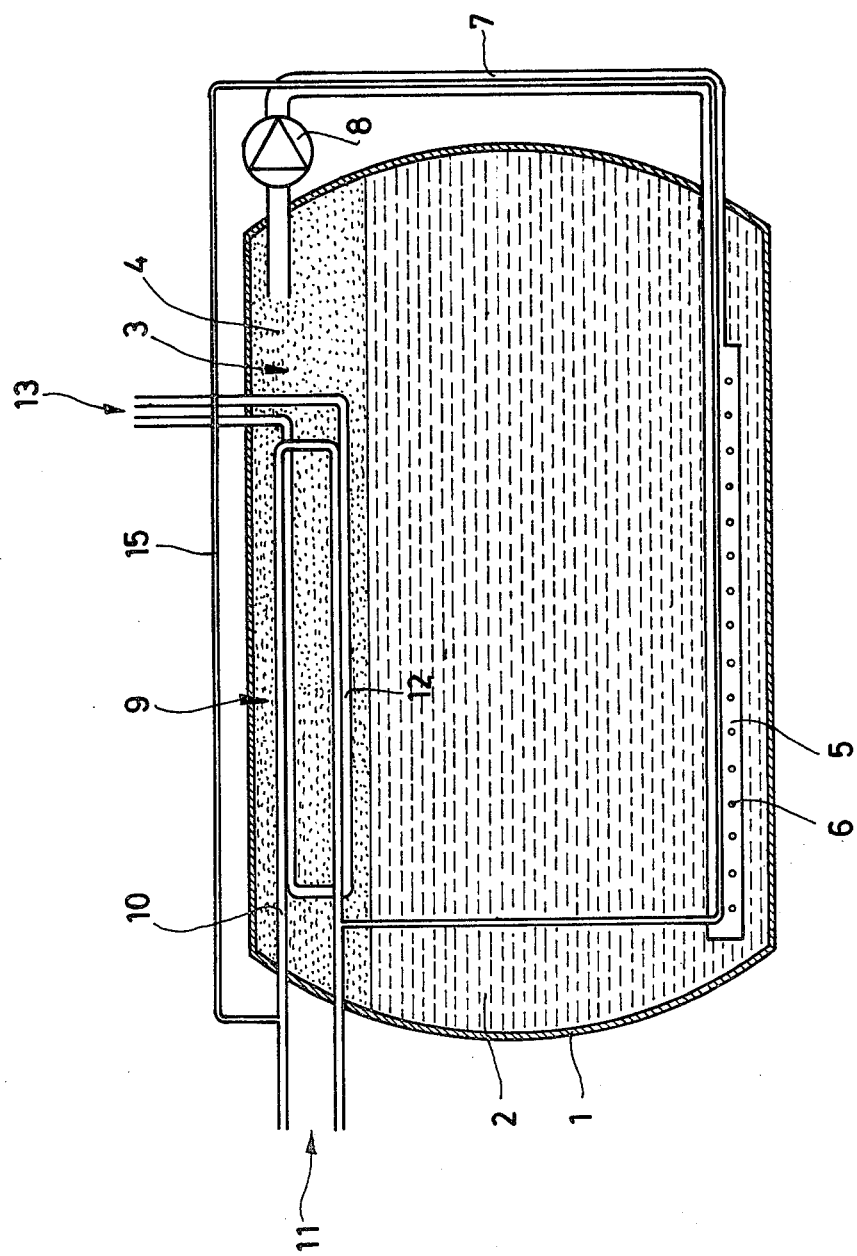
FIG. 2 is a view similar to FIG. 1 comprising a melting conduit connected to the primary conduit.

In FIG. 2, in which the construction is otherwise unchanged, a melting conduit 15 is provided which is connected into the primary circuit in parallel to the loop 10, the branching-off points of the melting conduit 15 being located in the main before the heat exchanger 9. The melting conduit 15 is conducted in heat-conductive contact along the return conduit 7 and the outlet conduit 5 and runs from the end of the outlet conduit 5 as a vertical feedpipe penetrating the heat storage medium 2 and up into the collecting chamber 3 where it again meets the loop 10.

Due to this the melting conduit 15 has the heat carrier medium adding heat flowing through it, which causes the solidified heat storage medium to melt in the area of the return conduit and the outlet conduit so that heat exchanger medium can still reach the heat storage substance via the return conduit and the outlet conduit even if the accumulator is discharged (solidified). The heat storage medium will also be caused to melt in the direct surroundings along the area of the melting conduit vertically penetrating the heat storage medium. This creates a connecting passage from the outlet conduit 5 to the collecting chamber 3, the heat exchanger medium thereby being completed even if the heat storage medium is still solidified.

In comparison with known melting conduits, which have the heat exchanger medium itself flowing through them, this development has the advantage that the melting conduit has the heat carrier medium adding heat flowing through it, this having a higher temperature than the heat exchanger medium. The melting process will, therefore, be accelerated.

Whereas the flow of heat exchanger medium through the melting conduit is always connected with the risk of the melting conduit being blocked since the heat exchanger medium carries heat storage medium with it and deposits this in the melting conduit the system according to the invention does not carry such a risk since the melting conduit does not have heat exchanger medium flowing through it but a heat carrier medium which does not come into contact at all with the heat storage medium.

In the embodiment illustrated in FIG. 2 the melting conduit is essentially conducted in parallel to the path of the heat exchanger medium. A different arrangement is shown, for example, in FIG. 3 where the loop 10 at the end of the heat exchanger 9 extends vertically down through the heat storage medium 2 to encircle the outlet conduit 5.

In addition, a melting conduit connected in parallel to the loop 10 branches off before the heat exchanger 9, this conduit, like the end of loop 10, penetrating the heat storage medium and encircling the outlet conduit 5. In this way vertical connecting passages in two areas of the vessel between the outlet conduit and the collecting chamber will be caused to melt.

Although the melting conduits are conducted in a different way to the embodiment shown in FIG. 2 the same basic principle is realized, according to which the heat carrier medium conveyed in the primary circuit is used to cause the flow path for the heat exchanger medium to melt.

Figure 4:
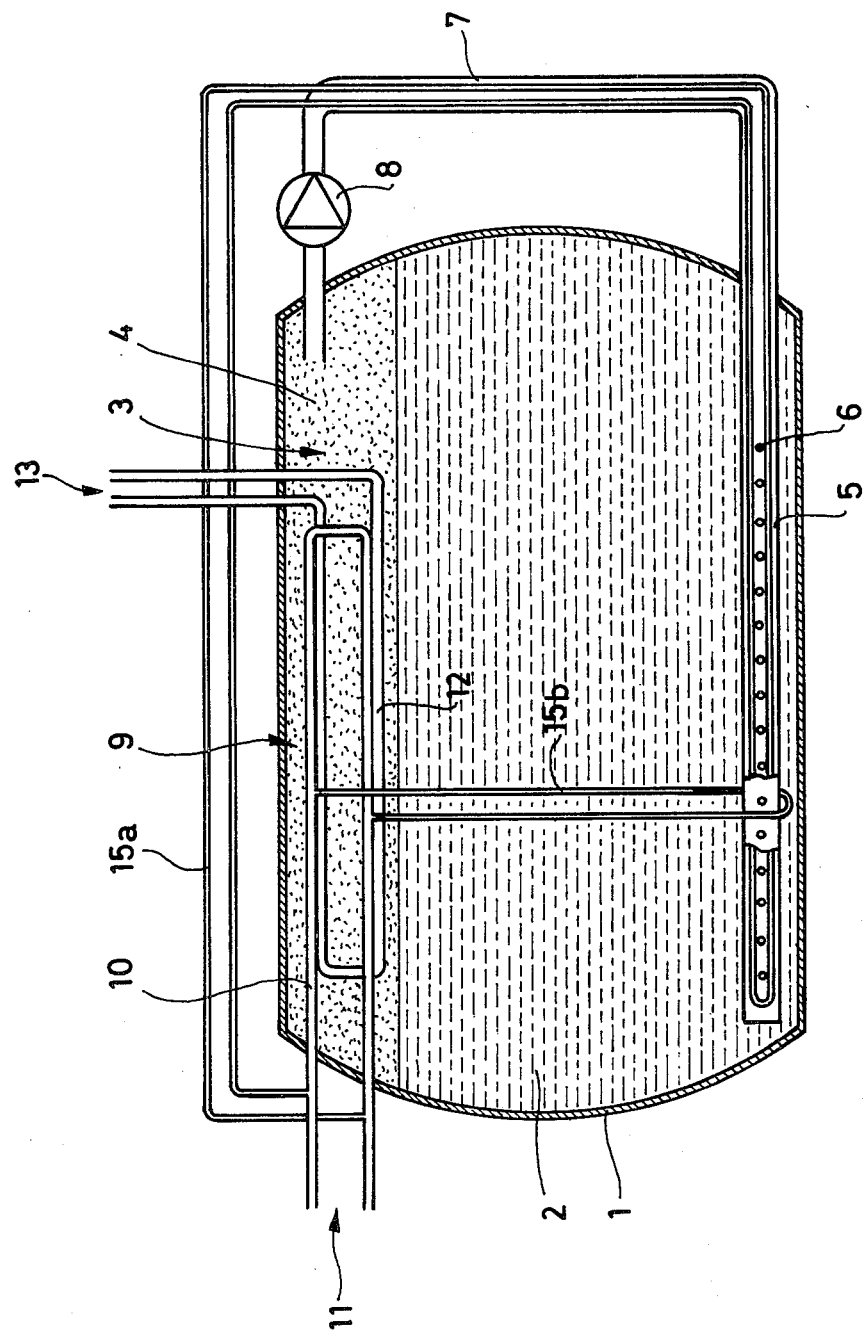
FIG. 4 is a view similar to FIG. 1 comprising two melting conduits connected in parallel to the primary circuit.

The embodiment of FIG. 4 illustrates a further, modified development of the melting conduits. First of all, a first melting conduit 15a is connected in parallel to the loop 10, the branching-off points lying before the heat exchanger 9. This melting conduit 15a is conducted inside the return conduit 7 and the outlet conduit 5 to the end of these conduits and back again inside the same conduits. A further melting conduit 15b is also provided in parallel to the end of the loop 10, this conduit branching off from the primary circuit in the embodiment illustrated inside the heat exchanger 9. This melting circuit 15b is conducted vertically down through the heat storage medium and encircles the outlet conduit. This embodiment therefore provides for two melting conduits connected in parallel into the primary circuit; both have heat carrier medium adding heat flowing through them, melting conduit 15a having the purpose of causing the return conduit and the outlet conduit to melt while the melting conduit 15b serves to melt a connecting passage to the collecting chamber.

Figure 3:
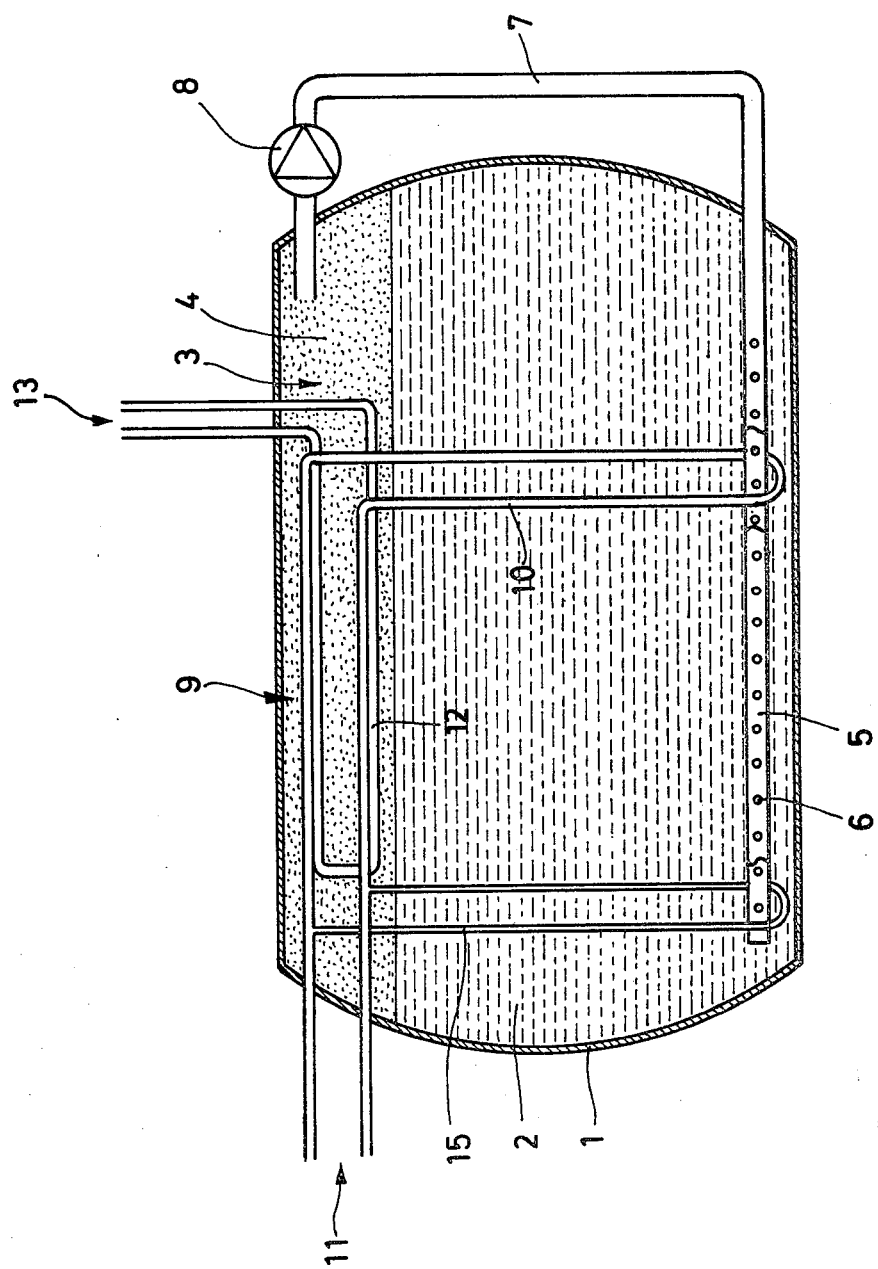
FIG. 3 is a view similar to FIG. 1 comprising a melting conduit connected in parallel to the primary circuit and one connected in series into the primary circuit.
Figure 5:
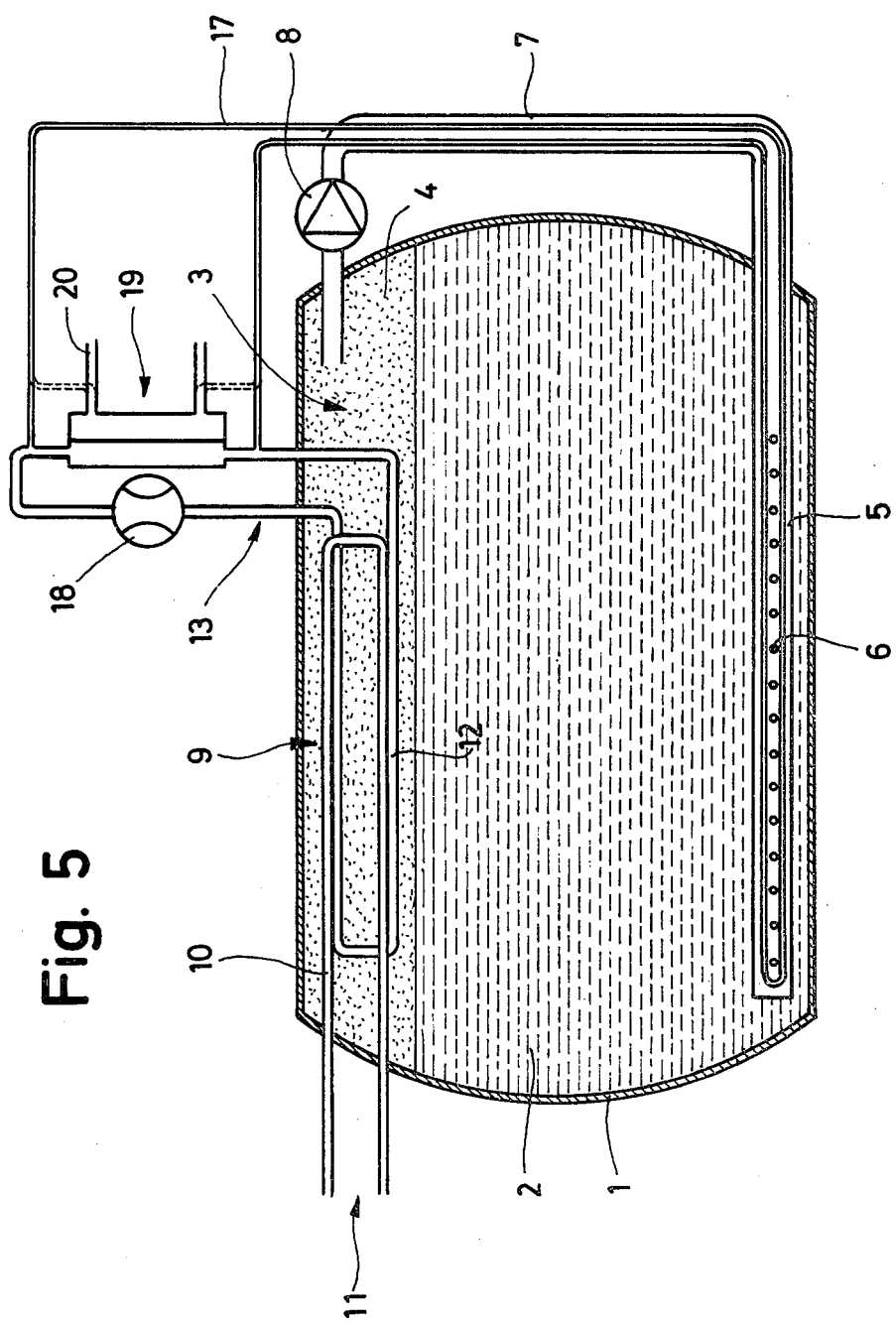
FIG. 5 is a view similar to FIG. 1 comprising a heat pump and a heat exchanger in the secondary circuit and a melting conduit connected into the secondary circuit in parallel to the heat exchanger.

Whereas the melting conduits in the embodiments illustrated in FIGS. 2 to 4 were all connected into the primary circuit the embodiment in FIG. 5 shows a development, with which a melting conduit 17 is connected into the secondary circuit. This circuit is formed as a heat pump circuit comprising a compressor 18, a heat exchanger 19 connected to this and an expansion device, which is not shown separately in the drawing, a heat exchanger 9 being connected to this. In this conduit system 13 (secondary circuit) the heat carrier medium is solidified in the compressor 18 and heated at the same time. A part of the heat is supplied in the heat exchanger 19 to a medium to be used in a conduit system 20. The cooled heat carrier medium is expanded in the expansion device, cooled further and enters the heat exchanger 9 as cold heat carrier medium. In the heat exchanger 9 it absorbs heat again from the heat exchanger medium and/or the primary circuit.

In this way the heat carrier medium has a high temperature when it enters the heat exchanger 19. In this embodiment the melting conduit 17 branches off in this area and, similar to the melting conduit 15a in the embodiment of FIG. 4, is conducted inside the return conduit and the outlet conduit to their end. The returning part of the melting conduit 17 enters the loop 12 below the heat exchanger 19. In this way the melting conduit has the heat carrier medium heated in the compressor 18 flowing through it. With this system it is, therefore, possible to use the heat stored in the latent heat accumulator itself to cause the solidified heat storage medium to melt, a relatively low power being necessary to drive the compressor 18 in order to increase the temperature of the quantity of heat from the relatively low temperature of the heat accumulator to the higher melting temperature.

As an alternative to the solution described on the basis of FIG. 5 the melting conduit 17 can have the medium to be used in the conduit system 20 flowing through it instead of the heat carrier medium of conduit system 14. Such an alternative development is indicated in FIG. 5 by a dotted-line connection between the melting conduit 17 and the conduit system 20, the points of connection with the conduit system 20 being disposed at the inlet and outlet of the heat exchanger 19 respectively. The melting conduit 17 is therefore connected in parallel to the actual circuit with the medium to be used, which is not expressly illustrated in FIG. 5.

This arrangement has the advantage that the melting conduit 17 can also have the non-aggressive, environmentally favourable medium to be used flowing through it, in a heating system, for example, water. The danger of chemically aggressive and dangerous heat carrier mediums being given off inside the latent heat accumulator will be further reduced.

The geometrical arrangement of the melting conduits may be selected in various ways; the essential factor is merely that the melting conduits keep a circuit free for the heat exchanger medium even if the heat storage medium is solidified.

It is also possible to connect the melting conduits into the circuit for the heat carrier medium in different ways according to the operating condition. For example, a melting conduit can be connected in series into the conduit system 11 of the heat carrier medium adding heat at the commencement of operations while a change-over can take place after the first melting of the heat storage medium such that the melting conduit is connected in parallel to the loop 10. In the first case the melting conduit will have the entire heat carrier medium conveyed in the circuit flowing through it, in the second case only a portion of it.

FIG. 6 shows a further, preferred embodiment of the latent heat accumulator according to the invention. This largely corresponds to the arrangement illustrated in FIG. 1; corresponding parts therefore have the same reference numerals.

In contrast to the construction of the latent heat accumulator illustrated in FIG. 1 this embodiment has a hollow chamber 22 inside the vessel 1 which is separated from the remaining interior space of the vessel 1 by a partition 21; the partition 21 is located on the side of the collecting chamber 3 filled with heat exchanger medium 4 which lies opposite to the heat storage medium 2 and is in heat-conductive contact with the heat exchanger medium 4.

The partition 21 has heat transfer ribs 23 projecting vertically into the heat exchanger medium 4 on the side facing the collecting chamber 3.

The hollow chamber 22 is connected into the conduit system 11 of the heat carrier medium and therefore has this heat carrier medium flowing through it. The other conduit system 13 for the other heat carrier medium is also located inside the hollow chamber 22.

This development has the advantage that the thickness of the layer of heat exchanger medium 4 in the collecting chamber 3 can be reduced so that a larger total quantity of heat storage medium can be stored in the vessel. An additional security against any leakage in the conduit system 13 is also obtained; any heat carrier medium escaping from this conduit system cannot come onto contact with the heat exchanger medium 4 and the heat storage medium 2 due to the separating partition 21. In a practical embodiment the hollow chamber 22 would, for example, have water flowing through it as heat carrier medium whereas in the conduit system 13 a cooling fluid such as freon would be conveyed in the circuit.

This embodiment could also, of course, have melting conduit branching off as described above.

We claim:

1. Latent heat accumulator comprising a vessel for receiving a latent heat storage medium and a circuit for a heat exchanger medium, said heat exchanger medium being immiscible with the latent heat storage medium, having a different density to the heat storage medium and being openly conveyed through the storage medium, a collecting chamber being provided in the vessel for the heat exchanger medium, a heat exchanger being disposed in said collecting chamber, an external heat carrier medium flowing through said heat exchanger, this heat exchanger bringing about a transfer of heat between heat carrier medium and heat exchange medium, characterized in that a first heat carrier medium adding heat and a second heat carrier medium withdrawing heat are conveyed in the heat exchanger (9) in separate conduit systems (11, 13), the two conduit systems (11, 13) being in heat-conductive contact with each other and with the surrounding heat exchanger medium (4).

2. Latent heat accumulator as in claim 1, characterized in that the exchanger surfaces of the heat exchanger (9), these surfaces being in heat-conductive contact with the heat exchanger medium (4), are in the main vertical surfaces.

3. Latent heat accumulator as in claims 1 or 2 comprising melting conduits in the storage vessel, these melting conduits being in heat-conductive contact with a conduit supplying the heat exchanger medium to the heat storage medium and leading from this conduit into the collecting chamber, characterized in that the melting conduits (15, 15a, 15b, 17) have heat carrier medium flowing through them.

4. Latent heat accumulator as in claim 3, characterized in that the melting conduits (15, 15a, 15b) have the first heat carrier medium adding heat flowing through them.

5. Latent heat accumulator as in claim 3, characterized in that a heat pump is disposed in the second conduit system (13) withdrawing heat and that at least a portion of the heat carrier medium heated by the heat pump is conveyed through the melting conduits (17).

6. Latent heat accumulator as in one of claims 5, characterized in that the melting conduits (15, 15a, 15b, 17) are connectable optionally in parallel to the conduit systems (11, 13) conducted through the heat exchanger (9) and optionally in series to these conduit systems.

7. Latent heat accumulator as in one of claims 1 or 2 comprising melting conduits in the storage vessel, these melting conduits being in heat-conductive contact with a conduit supplying the heat exchanger medium to the heat storage medium and leading from this conduit to the collecting chamber, characterized in that a heat pump is disposed in the second conduit system (13) withdrawing heat, a medium to be used being heatable via its condenser, and that the melting conduits (17) have at least a portion of the medium to be used flowing through them.

8. Latent heat accumulator as in claim 1, characterized in that a hollow chamber (22) closed off by a partition (21) is provided on the side of the collecting chamber (3) for the heat exchanger medium in the vessel (1) which lies opposite to the heat storage medium (2), the partition (21) being in heat-conductive contact with the heat exchanger medium (4) in the collecting chamber (3), that one of the two heat carrier mediums is passed through the hollow chamber (22) and that the conduit system (11) or (13) for the other heat carrier medium is disposed in the hollow chamber (22).

9. Latent heat accumulator as in claim 8, characterized in that heat transfer ribs (23) projecting vertically into the heat exchanger medium (4) are disposed on the partition (21) closing off the hollow chamber (22).

* * * * *